E. BROWN.
CARRIAGE-WHEEL.

No. 171,348. Patented Dec. 21, 1875.

Witnesses:
John Tyler
Arthur L. McIntire

Inventor:
Eleazer Brown
by atty.
Wm. C. McIntire

UNITED STATES PATENT OFFICE.

ELEAZER BROWN, OF GREENVILLE, PENNSYLVANIA.

IMPROVEMENT IN CARRIAGE-WHEELS.

Specification forming part of Letters Patent No. 171,348, dated December 21, 1875; application filed October 26, 1875.

*To all whom it may concern:*

Be it known that I, ELEAZER BROWN, of Greenville, in the county of Mercer and State of Pennsylvania, have invented certain new and useful Improvements in Carriage-Wheels; and I do hereby declare that the following is a full and exact description thereof, reference being had to the accompanying drawings making a part of this specification.

My invention relates to certain novel improvements in the construction of carriage-wheels, and their securement to their axles or spindles, as will be hereinafter more fully set forth.

To enable those skilled in the art to which my invention pertains to more fully understand the construction and operation thereof, I will proceed to describe the same, referring by letters to the accompanying drawing, in which—

Figure 1:
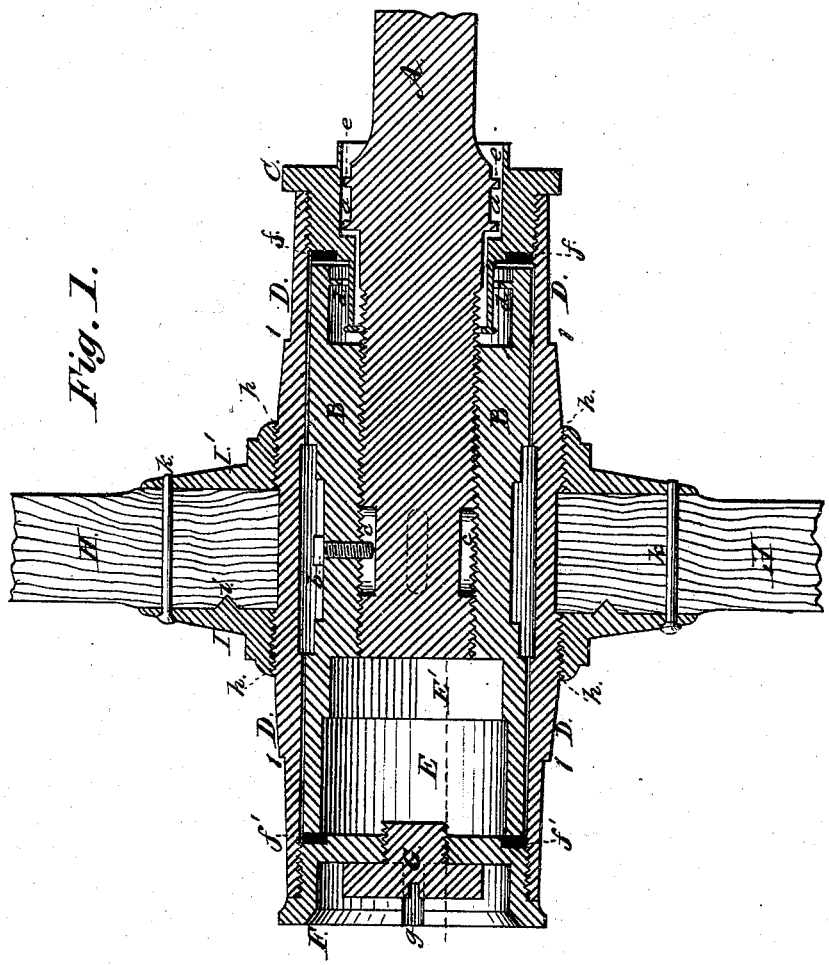
Figure 2:
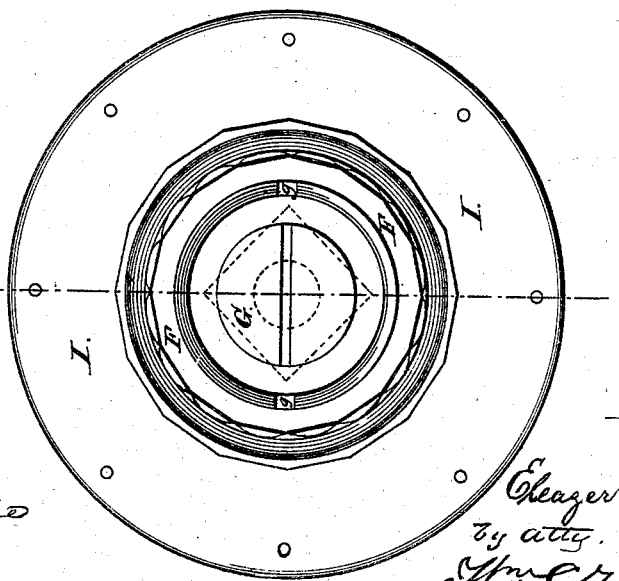

Figure 1 is a central longitudinal section of my improved wheel attached to its axle or spindle, and Fig. 2 a front-end view.

Similar letters indicate like parts in both figures.

A represents the axle or spindle, provided with a spool-groove, $a$, the forward end of the axle being stepped down to a smaller diameter and provided with a screw-thread, as clearly shown at Fig. 1, adapted to work in a corresponding thread cut in the interior periphery of a ferrule, B, the axle and ferrule being held in any given adjustment by a set-screw or plug, $b$, passing through one side of the ferrule and into a slot or slight depression, $c$, in the axle. There may be one or more of these depressions $c$, to facilitate nice adjustment of the parts. C is a nut adapted to hold the ferrule within the box D, and at the same time close the back end thereof against the exit of the lubricating-oil and the ingress of dirt and dust. This nut is provided with an extension at its forward end, slightly upset or flattened to form a slight flange internally and externally, the internal flange permitting the passage of the thread on the axle A, and yet fitting close enough to make a comparatively close joint, the external flange just passing an internal ring-flange, $d$, a short distance from the end of the ferrule B. The internal rear diameter of the nut C is greater than the forward extension thereof, and is adapted to fit sufficiently close to ring ends $e$ of the spool-groove $a$ to prevent the passage of oil or dust. This nut is secured to the end of the box D by a screw-thread, as clearly shown in Fig. 1, and is provided with a leather or other washer, $f$, to lubricate the end of the ferrule B.

It will be seen from the formation of the nut C that it must be placed upon the axle A before the latter is screwed to its place within the ferrule B, and it will also be seen that when the nut is screwed within the end of the box D, the latter is thereby secured in its proper relation with the ferrule, and that, the axle being held in adjustment and fixed to the ferrule by the screw-thread and set-screw or plug $b$, there is no frictional contact between the axle and ferrule with the nut C, which simply holds the box D in adjustment with the ferrule, and serves to prevent the ingress of dirt and dust and the escape of the lubricating-oil, as hereinbefore stated. The forward end of the ferrule B, beyond the end of the axle A, being hollow, serves as a cup or receptacle for the lubricating-oil. This cup is represented by the letter E, which is a perfectly cylindrical box, and by E', which represents a square box, which serves to give greater strength to the shell or ferrule, and receives the square end of a wrench for putting the ferrule in place. Of course, the receptacle may be of one shape and diameter throughout, or it may be of greater or less capacity, according to the thickness of the shell or ferrule. F is a dished screw-nut, adapted to close the forward end of the box D, and is provided with a washer, $f'$, similar to the washer $f$ on the nut C. This nut $f$ is provided with suitable slots or projections $g$, which may be griped by any suitable tool for screwing the nut to its place, or the external periphery may have flat faces, to accommodate an ordinary wrench. G is a flat or ornamentally-headed screw, passing through the nut F centrally, and, when removed, leaves a central hole through the nut, through which the spout of an oil-can may pass for pouring thin oil into the receptacle or space E E', in suitable quantities, or until it shall reach the level represented by the dotted line, when it will flow out through the hole in the nut F. The screw G, when in place, effectually closes this opening and confines the oil within the box, and it is gradually fed between the end of the ferrule and the washer $f'$ on the nut F, and is conveyed between the exterior periphery of the ferrule and the interior of the box D.

The exterior surface of the ferrule B, at the center thereof, is slightly countersunk, as shown, in order that the head of the set-screw or plug $b$ may lie below the plane of the contact-surfaces of the ferrule, either side of the center. The box D is slightly countersunk at or about the center, and serves, with the countersink in the ferrule, to slightly retard the travel of the oil, and forms, as it were, a secondary oil-receptacle.

Increasing or diminishing the countersinks determines the extent of friction-surface.

It will be seen that when the oil shall have reached the back end of the ferrule B, in order to escape it will have to travel up between the end of the ferrule and the washer $f$ on nut C; then over the bridge or ring-flange $d$; then up and around the double-flanged forward shell end of the nut C; thence around and over the spool-groove $a$ and its ring ends $e$. The line between the nut C and the rings $e$, being slightly above the plane of bottom of receptacle E, of course still further augments the difficulty of escape.

The ingress of dust could only be accomplished by a similar reverse travel.

The box D, on its exterior, is stepped upwardly at 1 1, a suitable distance from either end, to strengthen it and to enhance its design, and is again stepped to form a screw-thread, $h$, either side of the center, and stepping down at the termini of the threads to a plane in line with the step 1, thus forming, as it were, a central flat groove, adapted to receive the ends of spokes H, arranged in the usual manner—that is, radially.

I I' are screw-ring flanges, adapted to be run upon the screw-threads $h$ on the box D, so that they will approach each other. One of the flanges, I, is provided with a circular rib, $i$, which, when the flanges are screwed up to their places, lies within a suitable groove in the sides of the spokes, and thus holds them against radial displacement. When the ring-flanges I I' have been screwed up to their places, so as to firmly hold the spokes in place, a bolt or series of bolts, $k$, passing through the spokes at the points of contact with each other, and through the flanges, and headed, retains the flanges against movement which would conduce to the loosening of the spokes.

I do not wish to confine myself to this particular means of holding the flanges, as they may be secured by one or more radial screws passing into the box D through the hub of the flanges.

The steps 1 1 of the box D may be provided with any number of flat faces, by which it may be held in a vise or holder during the process of putting the parts together.

It will be observed that, by my novel construction of wheel and axle, thin oil may be used for lubricating purposes, and that an abundant supply for future use may be stored within the wheel, and be self-furnishing, as required; the parts of the structure are readily separable for cleaning or repair; there is no hub necessary in the formation of the wheel, the box itself performing the function of the hub; and that when, after long use, if there should be too much play between the ferrule and the box, a new or larger ferrule may be readily substituted for a small or worn one, and that this could be done without the necessity of employing a skilled mechanic, and without being deprived of the use of the vehicle furnished with such wheels an indefinite time.

Having described the construction and advantages of my invention, what I claim as new, and desire to secure by Letters Patent, is—

1. In combination with the axle A, threaded at its forward end, the open-ended ferrule B, provided with an interior screw-thread, the ferrule extending beyond the end of the axle to form an oil-receptacle, and being adjustably secured to the axle, substantially as and for the purposes set forth.

2. In combination with the ferrule B, secured to the axle, the box D, open at both ends, and adapted to receive screw-nuts C F, to secure the box in place upon the ferrule and afford access to the oil-receptacle, substantially as hereinbefore set forth.

3. The box D, provided with the screw-threads $h$, in combination with two screw-ring flanges, I' I, screwed up against the spokes from opposite directions, substantially as and for the purposes set forth.

4. The ferrule B, constructed with a receptacle, E E', in combination with the dish-nut F, having a central screw-plug, G, substantially as and for the purposes set forth.

5. In combination with the ferrule B, having its rear end formed, as described, with an annular bridge, $d$, the nut C, constructed, as described, with its flanged forward end, to prevent the passage of oil and dirt, as hereinbefore set forth.

6. In combination with the ferrule and nut C, constructed as described, the spool-groove $a\ e$ on the spindle or axle A, as and for the purposes hereinbefore set forth.

Witness my hand and seal this 26th day of October, A. D. 1875.

ELEAZER BROWN. [L. S.]

In presence of—
CHAS. C. WILSON,
WM. C. MCINTIRE.